United States Patent [19]
Morita et al.

[11] Patent Number: 5,617,387
[45] Date of Patent: Apr. 1, 1997

[54] OPTICAL SYSTEM FOR OPTICAL INFORMATION RECORDING/REPRODUCING APPARATUS

[75] Inventors: Takashi Morita; Suguru Takishima; Isao Okuda, all of Tokyo, Japan

[73] Assignee: Asahi Kogaku Kogyo Kabushiki Kaisha, Tokyo, Japan

[21] Appl. No.: 782,737

[22] Filed: Oct. 28, 1991

Related U.S. Application Data

[63] Continuation of Ser. No. 398,568, Aug. 25, 1989, abandoned.

[30] Foreign Application Priority Data

Aug. 31, 1988 [JP] Japan .................................. 63-217834

[51] Int. Cl.$^6$ .................. G11B 7/00; G02B 5/30
[52] U.S. Cl. ...................... 369/44.23; 369/44.24; 369/110; 369/112; 359/494; 359/495; 250/201.5
[58] Field of Search ....................... 350/375, 400, 350/401, 402; 369/44.13, 44.14, 44.15, 44.16, 110, 112, 44.23, 44.24; 359/494, 495, 497, 499; 250/201.5

[56] References Cited

U.S. PATENT DOCUMENTS

| | | | |
|---|---|---|---|
| 4,689,781 | 8/1987 | Ando | 369/112 |
| 4,805,992 | 2/1989 | Maeda | 369/112 |
| 4,812,638 | 3/1989 | Ogata et al. | 369/44.16 |
| 4,841,510 | 6/1989 | Yoshizawa | 369/110 |
| 4,862,446 | 8/1989 | Malda | 369/44.13 |
| 4,868,377 | 9/1989 | Nishikawa | 369/44.24 |
| 4,873,678 | 10/1989 | Nakamura et al. | 369/110 |

FOREIGN PATENT DOCUMENTS

| | | |
|---|---|---|
| 61-42739 | 3/1986 | Japan . |
| 63-91818 | 6/1988 | Japan . |

*Primary Examiner*—Ricky D. Shafer
*Attorney, Agent, or Firm*—Sughrue, Mion, Zinn, Macpeak & Seas

[57] ABSTRACT

In an optical system comprising a light source section consisting of a semiconductor laser and a collimator lens, an objective lens for focusing a light beam on an optical disk, a beam splitter for separating part of the light beam reflected from the optical disk, a condenser lens, and a photosensor for detecting the separated light beam to produce a focusing and a tracking error signal, a plane parallel plate is provided between the light source section and the beam splitter. By rotating the plane parallel plate with an adjusting mechanism, the light beam undergoes a parallel shift, so that the intensity distribution of light being incident on the objective lens is varied and a tracking offset due to a deviation of the optical axis of the output light from the light source section can be compensated for. The plane parallel plate may be disposed between the beam splitter and the condenser lens.

9 Claims, 5 Drawing Sheets

OPTICAL SYSTEM FOR OPTICAL INFORMATION RECORDING/REPRODUCING APPARATUS

This is a Continuation of application Ser. No. 07/398,568 filed Aug. 25, 1989, now abandoned.

BACKGROUND OF THE INVENTION

The present invention relates to an optical system for an optical information-recording/reproducing apparatus adapted for writing information to or reading information from recording media such as optical disks or magneto-optical disks.

A prior art optical system to be used in an optical information-recording/reproducing apparatus of the type contemplated by the present invention is shown schematically in FIG. 8. The optical system generally indicated by A in FIG. 8 consists of a semiconductor laser 1 emitting a light beam, a collimator lens 2 for collimating the emitted light beam, a shaping prism 3 for correcting the cross-sectional profile of the light beam, a half mirror prism 4, an objective lens 5 for forming a beam spot on a magnetooptical disk D, a half-wave plate 6, a condenser lens 7, a polarizing beam splitter 10 for splitting the output beam from the condenser lens 7 into two beams which are launched into a tracking error detecting photosensor 8 and a focusing error detecting photosensor 9, respectively, and a cylindrical lens 11 positioned in front of the focusing error detecting photosensor 9.

The tracking error detecting photosensor 8 performs tracking error detection by the "push-pull" method on the basis of the difference between the outputs from two adjacent light-receiving areas, whereas the focusing error detecting photosensor 9 performs focusing error detection by the astigmatic method on the basis of the difference between the sum of outputs from a pair of diagonal light-receiving areas in a 2×2 matrix array and the sum of outputs from the other pair of diagonal light-receiving areas.

In the optical system A described above, the half-wave plate 6 and the polarizing beam splitter 10 work in such a way that the rotation of the vibration plane caused by the magnetic Kerr effect is converted to changes in the intensity of light beams which are issued to the photosensors 8 and 9 so as to detect the recorded information.

FIG. 9 shows another prior art optical system for use in information recording/reproducing apparatus. In the optical system generally indicated by B, a polarizing beam splitter 20 with a wedge prism as shown in FIG. 10 is positioned in front of a condenser lens 10, and a photosensor 30 is a six-divided element comprising a focusing error detecting portion 31 and a tracking error detecting portion 32 as shown in FIG. 11. With this arrangement, as shown in FIG. 10, the S-polarization component of polarized light for detecting a focusing error component is reflected from the interface 21 between a triangular prism and the wedge prism whereas the P-polarization component for detecting a tracking error component is reflected from the back surfaces 22 and 23 of the wedge prism as two separate beams. The reflected light components are directed to the focusing and tracking error detecting portions, respectively, of the photosensor 30.

When the intensity distribution of parallel light beam being launched into the objective lens in the prior art optical systems A and B is offset on account of variations in the optical axis of output light from the semiconductor laser used as a light source, said optical axis is brought into alignment with the ideal optical axis of the system by adjusting the angle between the laser and the laser mounting plate using a wedge-shaped correcting element. However, not only does this practice involve considerable difficulty in attaining precise adjustment but also many correcting elements must be provided to compensate for various offset angles of the optical axis of output laser light.

The offset in the distribution of light intensity appears as a push-pull offset in the tracking error component when the light beam reflected from the optical disk is focused on the photosensor and the resulting difficulty in precise tracking control causes deterioration in the signal.

When a wedge prism is used to form two separate beams for tracking error detection as in the prior art optical system B, a positional offset in the wedge prism upsets the balance between the quantities of the separated P-polarization components of light, causing a tracking offset. In order to avoid this problem, the prism and the photosensor must be positioned with very high precision. Further, if the photosensor 30 is moved with a view to correct only the tracking error, an offset occurs in the focusing error, and for this reason, the tracking offset cannot be adjusted by changing the position of the photosensor.

SUMMARY OF THE INVENTION

The principal object of the present invention, therefore, is to provide an optical system for an optical information-recording/reproducing apparatus that allows for easy adjustment of variations in the optical axis of output light from a light source used, as well as positional offsets in a photosensor, wedge prism and other system components.

This object of the present invention can be attained by an optical system which includes: a light source section for emitting a light beam, an objective lens for focusing said light beam on an optical disk, a beam splitter provided in the optical path between said light source section and said objective lens for allowing a part of the reflected light beam from the optical disk to be separated from the optical path, a condenser lens for converging the separated light beam on a photosensor, a plane parallel plate provided in the optical path from said light source section to said condenser lens, and an adjusting mechanism for rotatably or pivotally supporting said plane parallel plate about an axis which corresponds to the tangential direction of the optical disk when said axis is projected onto the disk.

Having the construction described above, the optical system of the present invention performs pivotal or rotational adjustment of the plane parallel plate to compensate for the tracking offset that is detected from the photosensor.

Other and further objects, features and advantages of the invention will appear more fully from the following description taken in connection with the drawings.

DESCRIPTION OF THE PREFERRED EMBODIMENTS

Two embodiments of the present invention are described below with reference to the accompanying drawings.

Figure 1:
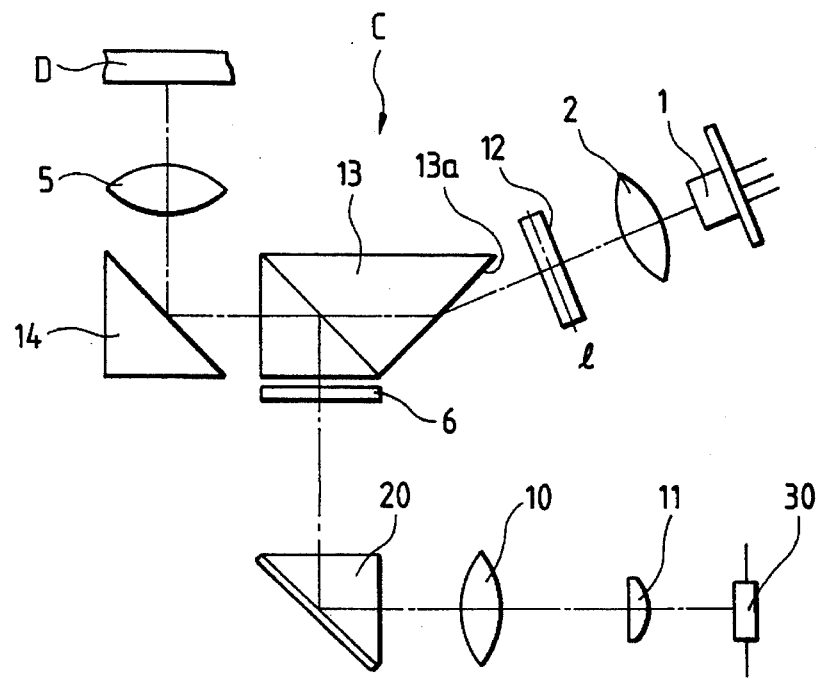
FIG. 1 shows diagrammatically an optical system for use in an optical information-recording/reproducing apparatus according to a first embodiment of the present invention.

FIGS. 1–5 show a first embodiment of the present invention. As shown in FIG. 1, an optical system generally indicated by C comprises a light source section composed of a semiconductor laser 1 and a collimator lens 2, a plane parallel plate 12, a beam splitter 13 integral with a shaping prism, a reflector prism 14 for reflecting a light beam toward a magnetooptical disk D, and an objective lens 5 which converges the collimated light beam to form a beam spot on the disk D. Actually, although different from the diagram of FIG. 1, the disk D is disposed in parallel with the paper surface of the figure and the reflector prism 14 reflects the light beam from the beam splitter 13 to the direction perpendicular to the paper surface.

Part of the reflected light from the disk D is reflected by the beam splitter 13 to travel in a direction different from the incident direction and passes through a half-wave plate 6, a polarizing beam splitter 20 with a wedge prism, a condenser lens 10 and a cylindrical lens 11 to be focused on a photosensor 30.

Figure 2:
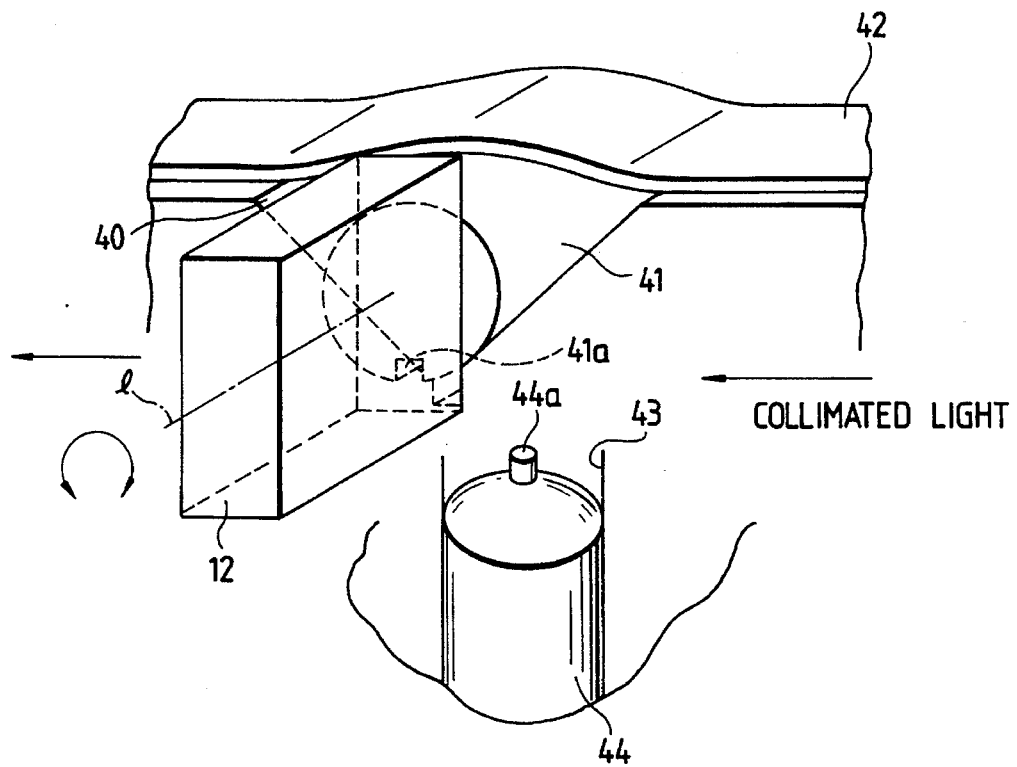
FIG. 2 shows diagrammatically an example of an adjusting mechanism used in the optical system of FIG. 1.

The plane parallel plate 12 is mounted on an adjusting mechanism as shown in FIG. 2 and is supported rotatably about an axis l which corresponds to the tangential direction of the optical disk when it is projected onto the disk.

The adjusting mechanism consists of a cylindrical holder 41 which rests in a V-shaped groove 40 in the body and has the plane parallel plate 12 fixed at one end, a leaf spring 42 which retains said holder 41 from above in a rotationally adjustable manner, and an adjusting element 44 inserted into a guide hole 43 which is made in the body from below as viewed in FIG. 2. The tip of the adjusting element 44 is provided with a pin 44a that projects from an off-centered position. With the pin 44a being placed in engagement with a corresponding cutout 41a in the holder 41, the holder can be adjusted rotationally by pivoting the adjusting element 44. The plane parallel plate 12 is adjustable by rotation about the axis of the holder 41 since the plate 12 is formed either as an integral part of the holder 41 or bonded to the latter with an adhesive to form a unitary assembly.

Figure 3A:
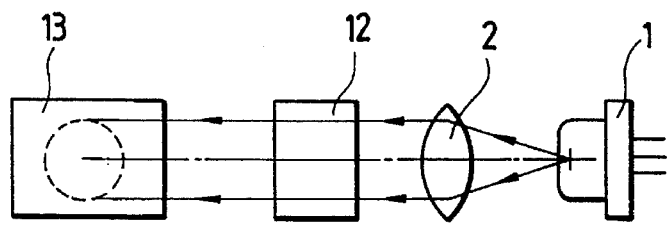
FIGS. 3(a) and 3(b) show diagrammatically the action of a plane parallel plate in the optical system shown in FIG. 1.
Figure 3B:
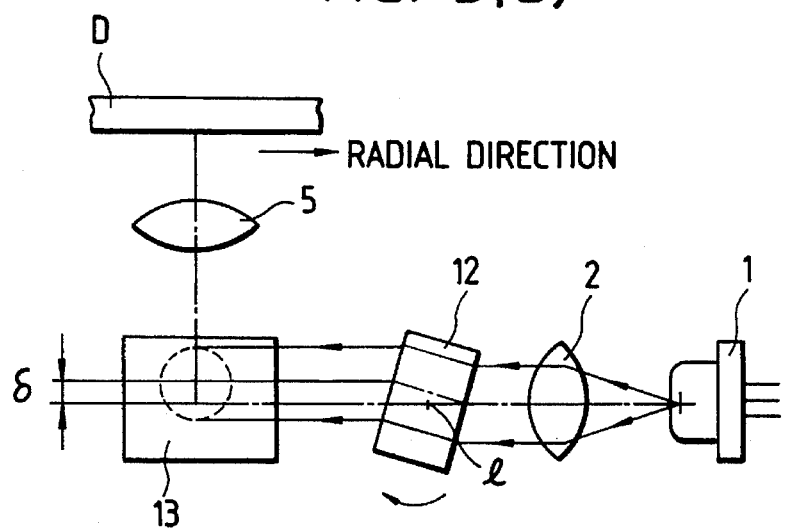

When the plane parallel plate 12 is positioned in an area where a parallel light beam is formed between the collimator lens 2 and the beam splitter 13 as described above, the plate will not cause any change in the subsequent optical path as shown in FIG. 3(a) if the plate is perpendicular to the optical axis of the incident parallel light beam. However, if the plane parallel plate 12 is pivoted as shown in FIG. 3(b), the light beam will undergo parallel shift by a distance of 8 so that the intensity distribution of light being launched into the objective lens 5 can be varied. This shift direction of the light beam corresponds to the radial direction of the disk D as shown in FIG. 3(b).

Figure 10:
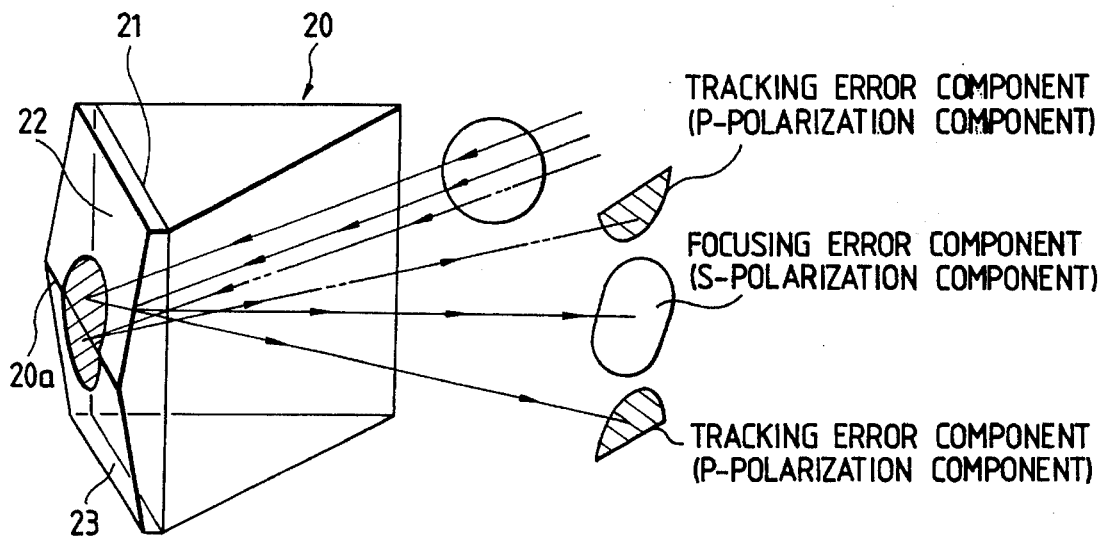
FIG. 10 is a perspective view of a beam splitter with a wedge prism.

The beam splitter 20 with a wedge prism is constructed as shown in FIG. 10 and has a first reflecting surface 21 forming an angle of about 45 degrees with the optical axis of the light beam emerging from the half-wave plate 6, and roof-shaped second and third reflecting surfaces 22 and 23 that are inclined respectively at predetermined angles with respect to the first reflecting surface 21. The first reflecting surface 21 has a polarizing separation coat that reflects the S-polarization component of light while transmitting the P-polarization component.

The ridgeline 20a where the second and third reflecting surfaces 22 and 23 meet has a length which is generally equal to the diameter, in the track-width direction, of a beam spot of the light that has passed through the first reflecting surface 21. The light beam incident upon this ridgeline portion is reflected from the back surfaces of the wedge prism into two beams to provide either positive or negative polarity for the tracking error.

Figure 11:
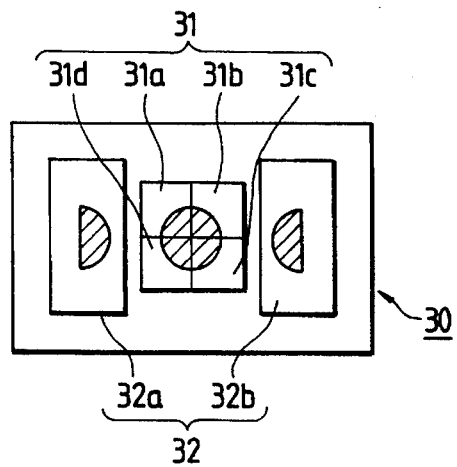
FIG. 11 is a plan view of a photosensor.

As shown in FIG. 11, the photosensor 30 has a focusing error detecting portion 31 composed of four light-receiving areas 31a, 31b, 31c and 31d arranged in a 2×2 matrix array, and a tracking error detecting portion 32 composed of two light-receiving areas 32a and 32b positioned on opposite sides of the focusing error detecting portion 31.

The optical system C having the construction described above operates in the following way. A linearly polarized light beam emanating from the semiconductor laser 1 are collimated by the collimator lens 2. The shape of the beam is corrected to have a circular cross section by the incident surface 13a of the beam splitter 13 with a shaping prism, and part of the corrected beam is transmitted through the splitter 13 to the reflector prism 14. The beam reflected from the reflector prism 14 is focused by the objective lens 5 to form a spot on the magnetooptical disk D. The reflected light from the disk D makes another passage through the objective lens 5 to be incident on the beam splitter 13.

The reflected light from the beam splitter 13 passes through the half-wave plate 6 and reaches the first reflecting surface 21 of the beam splitter 20 with a wedge prism. As shown in FIG. 10, the S-polarization component of light with respect to the first reflecting surface 21 is reflected by said surface, whereas the P-polarization component of light with respect to the first reflecting surface 21 is admitted into the wedge prism and reflected by the second and third reflecting surfaces 22 and 23 to travel back in different directions. Each of the reflected beams passes through the focusing lens 10 and cylindrical lens 11 to converge on the photosensor 30.

In order to compensate for the focusing or tracking error that may be caused owing to the surface wobbling or track eccentricity of the magnetooptical disk D, the objective lens 5 is driven with an actuator (not shown) on the basis of the error signals to be described below.

On the following pages, the operation of an apparatus for writing information to or reading information from a magnetooptical disk using the optical system C is described for a writing and a reading mode separately.

In the writing mode (when information is recorded on the magnetooptical disk D), the semiconductor laser 1 is oscillated in response to an information signal and a small spot of a high-power laser beam is focused on a selected area of the track on the disk D. The temperature of the irradiated area of the disk is elevated by the laser beam so as to reduce the coercive force of that area while at the same time, a weak magnetic field is applied externally from a magnet (not shown) to reverse the magnetization of the heated area. Thus, the direction of magnetization becomes different between the area irradiated with the laser beam and the area which is not irradiated, allowing information to be recorded in accordance with this difference in the direction of magnetization.

In the reading mode, the thus recorded information is reproduced on the basis of the rotation of the polarization direction caused by the magnetic Kerr effect as in the same manner as the prior art apparatus. In the optical system C being considered, the polarization direction of the laser beam reflected from the disk D is rotated by either +θ or −θ depending upon the direction of magnetization of the area where the beam has formed a focused spot, and after the beam is reflected from the beam splitter 13, it is rotated by 45 degrees by means of the half-wave plate 6.

The laser light that has undergone the rotation of the polarization direction is admitted into the beam splitter 20 with a wedge prism, by which it is separated into a P-polarization and an S-polarization component which are respectively launched into the tracking error detecting portion 32 and focusing error detecting portion 31 of the photosensor 30. By obtaining the difference between the outputs of the two error detecting portions 31 and 32, a reproduced signal of positive or negative polarity can be obtained which is generally proportional to 2θ.

The focusing error signal can be detected by the astigmatic method on the basis of the difference between the sum of the outputs from the light-receiving areas 31a and 31c and the sum of the outputs from the light-receiving areas 31b and 31d.

The tracking error signal can be detected by subtracting the output of the light-receiving area 32a of the tracking error detecting portion 32 from the output of the area 32b, or vice versa.

The intensity of light launched into the respective light-receiving areas 32a and 32b will vary depending upon the relative positions of the beam spot and the associated guide groove. In other words, the light that has formed a focused beam spot on the disk D is diffracted by a guide groove in the disk, so that the far-field pattern of the reflected light will also change depending upon the relative positions of the beam spot and the guide groove. Since the second and third reflecting surfaces 22 and 23 of the wedge prism in the beam splitter 20 are so designed that the reflected light is separated into two beams to produce either a positive or negative polarity depending upon the far-field pattern of said reflected light, tracking error can be detected by the push-pull method by means of subtracting the output of the irradiated area 32a from the output of the also irradiated area 32b, or vice versa.

If the optical axis of output light from the light source section is not in alignment with the ideal optical axis and accordingly the tracking error component contains an offset, the adjusting mechanism already described may be activated to rotate the plane parallel plate 12 by an appropriate angle, thereby creating a symmetrical distribution of the intensity of the input light to the objective lens 5 so as to enable rejection of the push-pull offset detected by the photosensor 30.

Figure 4:
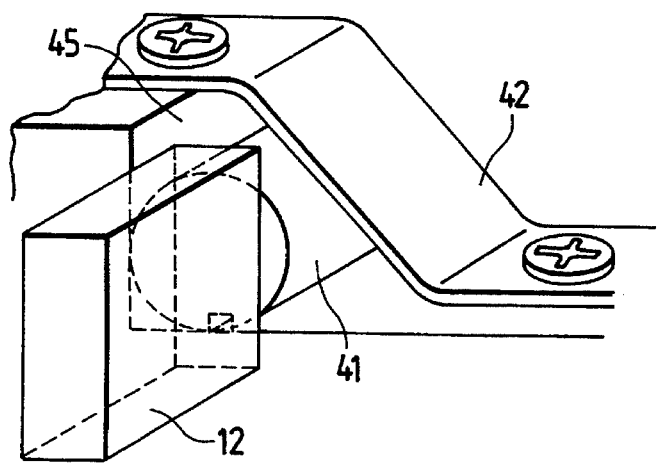
FIGS. 4 and 5 show diagrammatically modifications of the adjusting mechanism.
Figure 5:
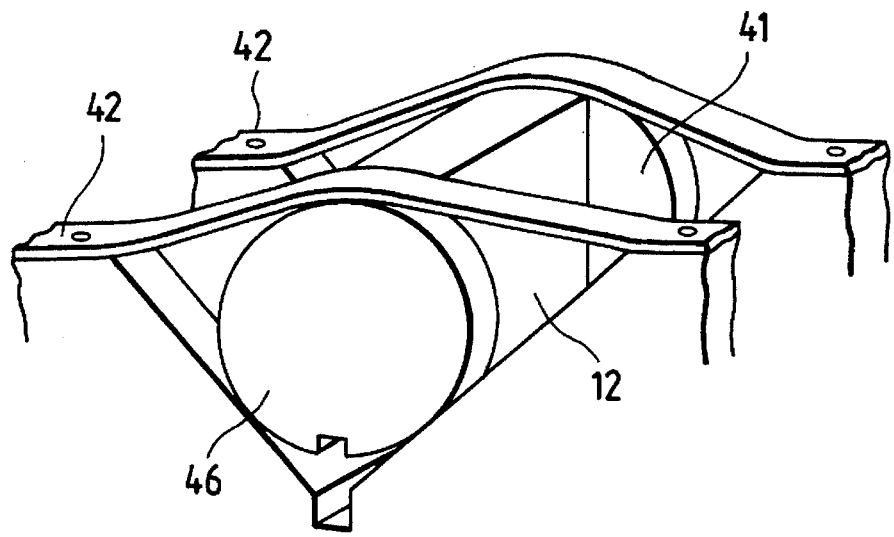

FIGS. 4 and 5 show modifications of the adjusting mechanism. The mechanism shown in FIG. 4 uses the leaf spring 42 in such a way that it places the holder 41 in position with respect to an L-shaped step 45. This construction has the advantage of simplicity. In the mechanism shown in FIG. 5, the plane parallel plate 12 is retained on opposite sides by means of thin holders 46 so as to reduce the space required.

Figure 6:
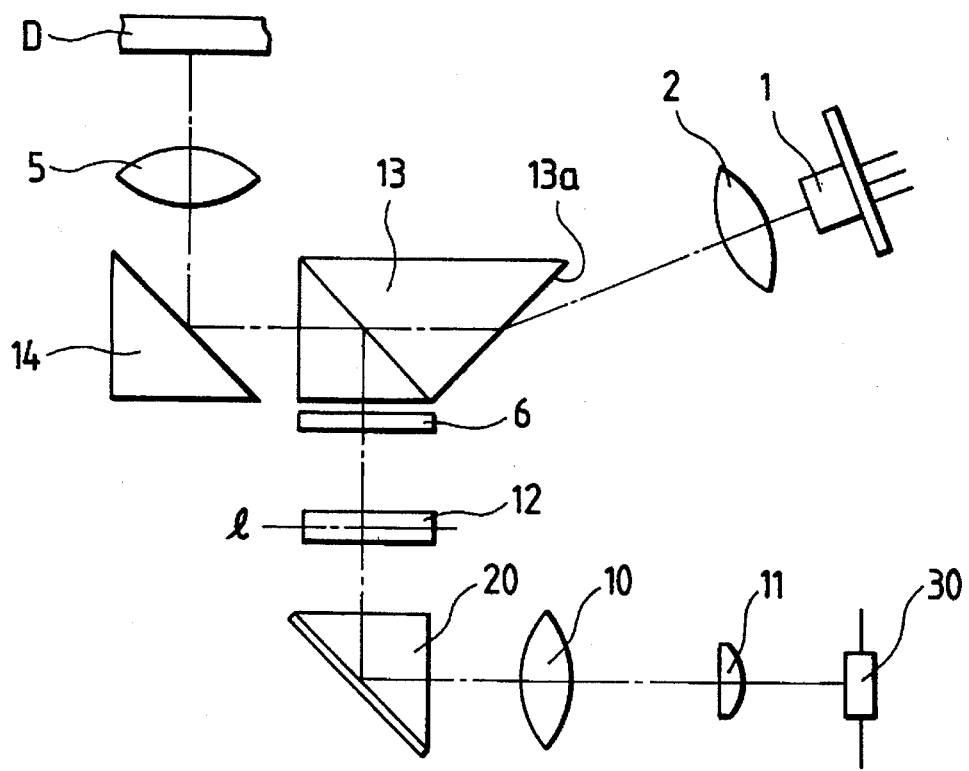
FIG. 6 shows diagrammatically an optical system for use in an optical information-recording/reproducing apparatus according to a second embodiment of the present invention.
Figure 7A:
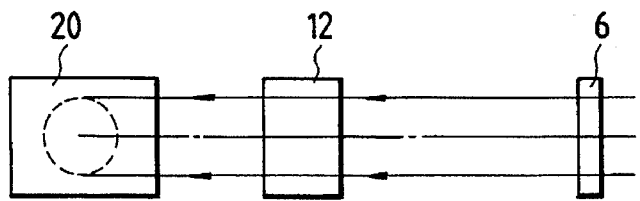
FIGS. 7(a) and 7(b) show diagrammatically the action of a plane parallel plate in the optical system shown in FIG. 6.
Figure 7B:
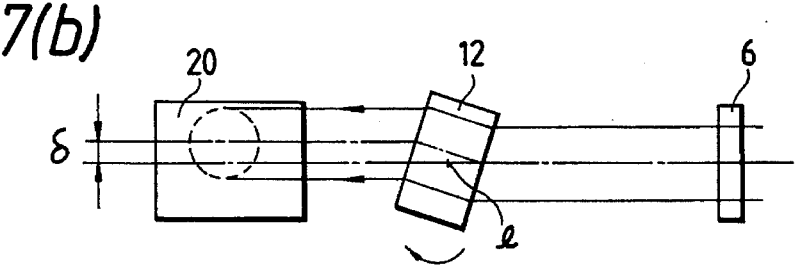

FIGS. 6 and 7 show a second embodiment of the present invention, which is essentially the same as the first embodiment described above, except that the plane parallel plate 12 is disposed between the half-wave plate 6 and the beam splitter 20 with a wedge prism. The adjusting mechanism employed in the second embodiment may have the same design as in the first embodiment. As explained in conjunction with FIG. 1, actually the disk D is placed in parallel with the paper surface of FIG. 6.

As shown in FIG. 7, the principal advantage of this embodiment is that by rotational adjustment of the plane parallel plate 12, the position of the P-polarization component light as relative to the ridgeline 20a of the wedge prism can be varied in such a way as to control the balance between the quantities of resultant separated light beams. Thus, a tracking offset that may result from a low precision in the position of the beam splitter 20 or photosensor 30 can be easily compensated for in accordance with the second embodiment.

Figure 8:
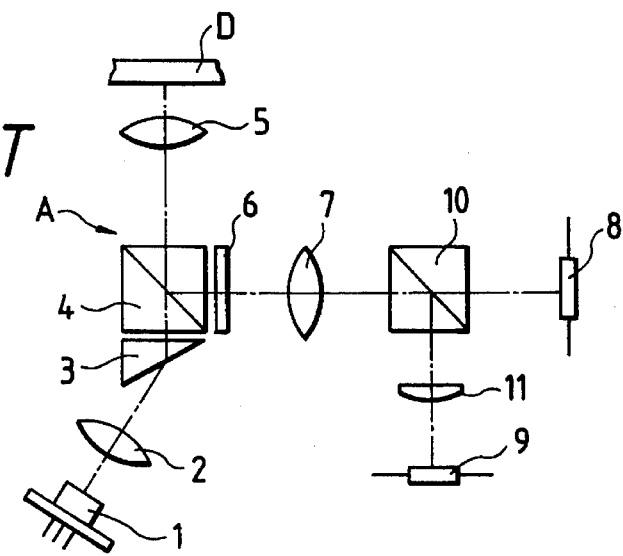
FIG. 8 shows diagrammatically a prior art optical system for use in an optical information-recording/reproducing apparatus.
Figure 9:
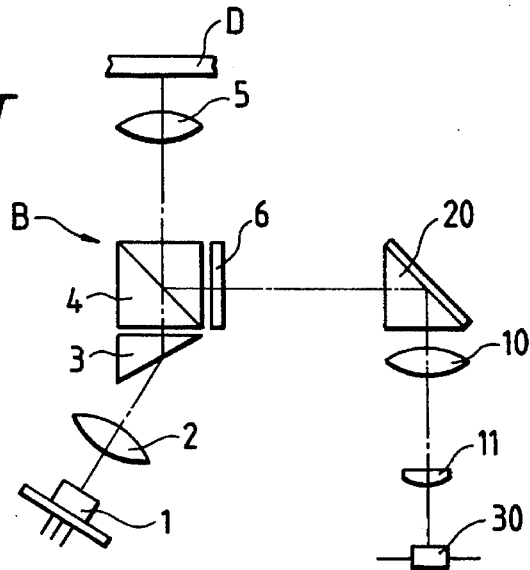
FIG. 9 shows diagrammatically another prior art optical system.

Both the first and second embodiments described above assume the use of a unified photosensor which is capable of detecting tracking and focusing errors with a single device, but it should of course be understood that the concept of the present invention is equally applicable to an optical system of the separated type as shown in FIG. 8.

As described on the foregoing pages, the present invention offers the advantage that an offset in the distribution of light intensity resulting from variations in the optical axis of output light from the light source section or a tracking offset due to the positional misalignment between the wedge prism and light beam can be easily corrected by rotational adjustment of the plane parallel plate.

What is claimed is:

1. An optical system for use in an optical information-recording/reproducing apparatus, comprising:

a light source for emitting a parallel light beam for travelling along an optical path from said light source to a photosensor;

an objective lens for focusing said light beam onto a spot on an optical disk in said optical path, said light beam being reflected by said optical disk;

first optical means in said optical path for receiving a reflected light beam from said optical disk and for providing at least a portion of said reflected light beam as an output, wherein said first optical means comprises a beam splitter disposed between said light source and said optical disk in said optical path, for passing light from said light source to said objective lens and for receiving said reflected light and separating a portion of said reflected light as said output;

a condenser lens in said optical path for converging the light output from said first optical means onto a sensing position on said photosensor;

a transparent optical member without optical power provided between said light source and said condenser lens in said optical path, wherein said transparent optical member is provided in said optical path, between said beam splitter and said condenser lens;

an adjusting mechanism for rotating said transparent optical member about an axis to shift said sensing position in a direction corresponding to a radial direction of said optical disk;

a half-wave plate provided in said optical path between said beam splitter and said transparent optical member; and a further beam splitter with a wedge prism provided in said optical path between said transparent optical member and said condenser lens, said further beam splitter comprising a first reflecting surface coated with a polarizing separation coating for reflecting a first one of two orthogonally polarized components of said portion of said reflected light to a direction different from an incident direction thereto and transmitting a second component, and a second and a third reflecting surface formed on a back side of said wedge prism for reflecting said transmitted second component from said first reflecting surface and separating it into two beams so as to provide either positive or negative polarity for a tracking error;

wherein said photosensor comprises a focusing error detecting portion for detecting the first component of said separated portion of said reflected light reflected from said first reflecting surface, and tracking error detecting portions provided at opposite sides of said focusing error detecting portion for detecting said two beams reflected from said second and third reflecting surfaces, respectively.

2. An optical system for use in an optical information-recording/reproducing apparatus, comprising:

a light source for emitting a parallel light beam for travelling along an optical path from said light source to a photosensor;

an objective lens for focusing said light beam onto a spot on an optical disk in said optical path for reflection by said optical disk;

first optical means comprising a beam splitter disposed between said light source and objective lens in said optical path for passing light from said light source to said objective lens and for receiving a reflected light beam from said optical disk and for separating a portion of said reflected light beam as an output;

a condenser lens in said optical path for converging the light output from said first optical means on said photosensor;

a transparent optical member without optical power provided between said light source and said beam splitter in said optical path for receiving said parallel light beam emitted by said light source and transmitting said parallel light beam toward said objective lens; and an adjusting mechanism for rotating said transparent optical member about an axis transverse to said optical path to shift said parallel light beam in a direction which corresponds to movement of said spot in a radial direction of said optical disk.

3. An optical system as claimed in claim 2, wherein said transparent optical member is a plane parallel plate.

4. An optical system according to claim 2, wherein said light source comprises a source of divergent light in combination with a collimator lens disposed between said divergent light source and said transparent optical member in said optical path.

5. An optical system for use in an optical information-recording/reproducing apparatus, comprising:

a light source for emitting a parallel light beam for travelling along an optical path from said light source to a photosensor;

an objective lens for focusing said light beam onto a spot on an optical disk in said optical path for reflection by said optical disk;

first optical means comprising a beam splitter disposed between said light source and said optical disk in said optical path for passing light from said light source to said objective lens and for receiving a reflected light beam from said optical disk and for separating a portion of said reflected light beam as an output;

a condenser lens in said optical path for converging the light output from said first optical means on said photosensor;

a transparent optical member without optical power provided between said beam splitter and said condenser lens in said optical path for receiving said light output from said first optical means and transmitting said light output to said condenser lens, said light received by and provided from said transparent optical member being a parallel light beam; and an adjusting mechanism for rotating said transparent optical member about an axis transverse to said optical path to shift said light output from said first optical means in a direction which corresponds to movement of said spot in a radial direction of said optical disk.

6. An optical system according to claim 5, further comprising a second beam splitter having a wedge prism disposed between said transparent optical member and said condenser lens in said optical path.

7. An optical system as claimed in claim 5, wherein said transparent optical member is a plane parallel plate.

8. An optical system for use in an optical information-recording/reproducing apparatus, comprising:

a light source for emitting a parallel light beam for travelling along a first optical path between said light source and an optical disk;

an objective lens for focusing said light beam on to a spot on said optical disk for reflection by said optical disk;

a beam splitter provided between said light source and said objective lens in said first optical path, for passing light from said light source to said objective lens and for receiving a reflected light beam from said optical disk and separating from said first optical path at least a portion of said reflected light beam as an output to be provided along a second optical path to a photosensor;

a half-wave plate in said second optical path for transmitting the separated light beam from said beam splitter;

a wedge prism provided downstream of said half-wave plate in said second optical path, said wedge prism comprising a first reflecting surface coated with a polarizing separation-coating for reflecting a first one of two orthogonally polarized components of the transmitted light beam from said half-wave plate to a direction different from an incident direction thereto and transmitting a second component, and a second and a third reflecting surface provided on a back side of said wedge prism for reflecting the transmitted second component to two different directions while separating it into two beams so as to provide either positive or negative polarity for a tracking error;

a condenser lens for converging the light beams reflected from said first, second and third reflecting surfaces of the wedge prism onto said photosensor;

a plane parallel plate provided in said second optical path between said beam splitter and said wedge prism; and an adjusting mechanism for rotating said plane parallel plate about an axis transverse to said second optical path to shift said light beams reflected from said first, second and third reflecting surfaces in a direction which corresponds to movement of said spot in a radial direction of said optical disk.

9. The optical system as claimed in claim 8, wherein said photosensor comprises a focusing error detecting portion for detecting the first component of said separated portion of said reflected light reflected from said first reflecting surface, and tracking error detecting portions provided at opposite sides of said focusing error detecting portion for detecting said two beams reflected from said second and third reflecting surfaces, respectively.

* * * * *